United States Patent [19]

Waterhouse

[11] Patent Number: 4,911,397

[45] Date of Patent: Mar. 27, 1990

[54] SPRING HANGER SYSTEM FOR RECTANGULAR WAVEGUIDE

[75] Inventor: Lauris D. Waterhouse, Raymond, Me.

[73] Assignee: General Signal Corporation, Stamford, Conn.

[21] Appl. No.: 332,200

[22] Filed: Apr. 3, 1989

[51] Int. Cl.[4] .............................................. F16M 13/00

[52] U.S. Cl. ...................................................... 248/610

[58] Field of Search ............... 248/610, 611, 612, 127, 248/158, 176, 97; 333/248

[56] References Cited

U.S. PATENT DOCUMENTS

| | | | |
|---|---|---|---|
| 1,783,749 | 12/1930 | Roehl | 248/97 |
| 2,643,842 | 6/1953 | Diserens | 248/97 |
| 2,995,329 | 8/1961 | Talcott, Jr. | 248/97 |
| 4,682,752 | 7/1987 | Pischzik | 248/610 X |

*Primary Examiner*—Ramon O. Ramirez

*Attorney, Agent, or Firm*—Robert R. Hubbard; John F. Ohlandt

[57] ABSTRACT

A spring hanger system for supporting a rectangular waveguide on a transmission tower or other structure, including a plurality of vertically spaced spring hangers, each adapted to engage and support a section in the vertical run of the waveguide. Each hanger includes (1) a lateral support guide for restraining the guide from any appreciable movement in all directions except vertical, and adapted for fixation to the supporting structure; (2) a gripping frame adapted to grip tightly the outer periphery of the waveguide without seriously deforming same, the gripping frame being spaced vertically below the lateral support guide; and (3) a relatively constant force spring mechanism connecting said gripping frame to said lateral support guide, thus allowing the waveguide to move upwardly and downwardly with variations in temperature without substantially changing the top loading on the tower.

13 Claims, 3 Drawing Sheets

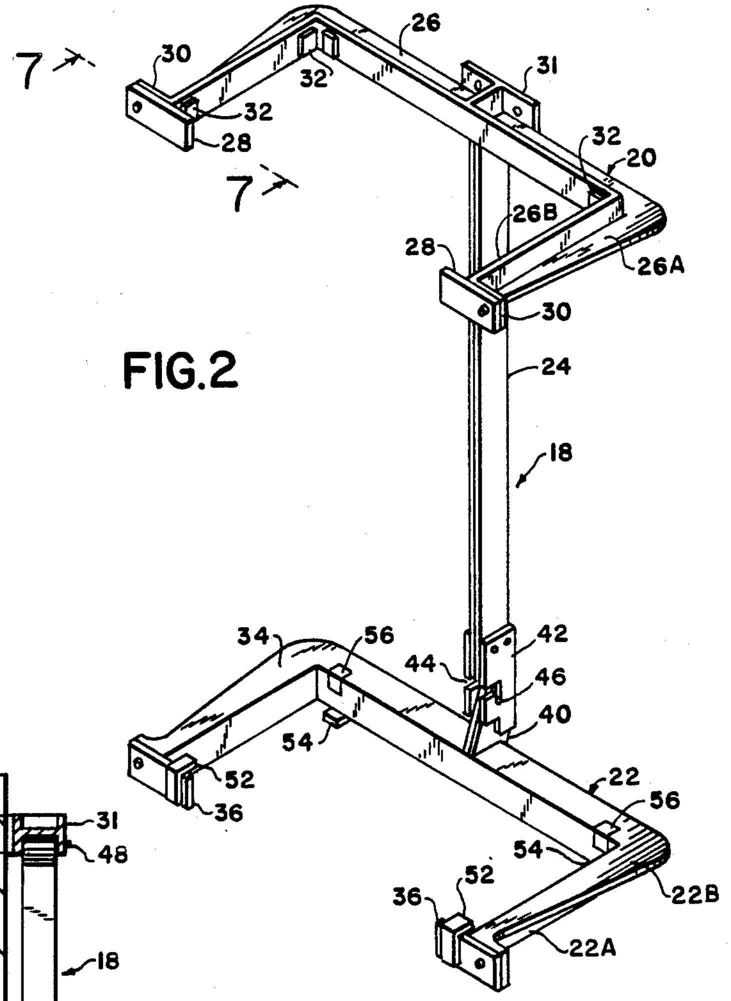
FIG.2
FIG.3
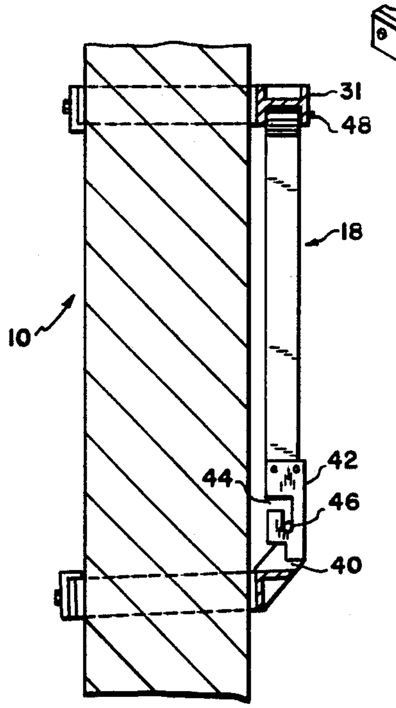
FIG.7
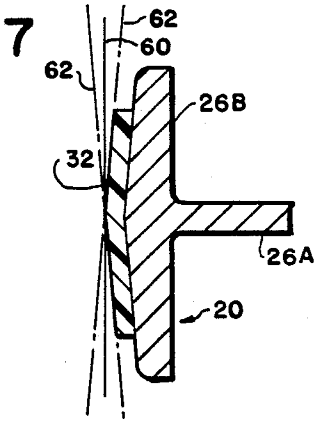

FIG.4a
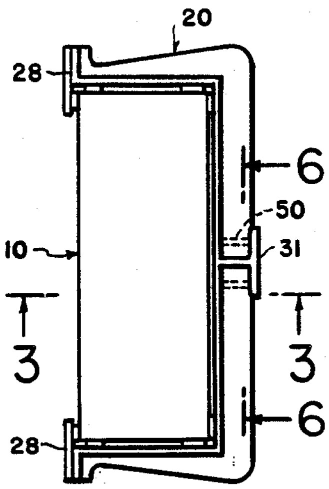
FIG.4b
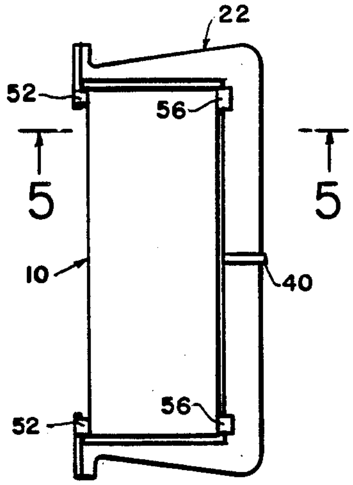
FIG.5
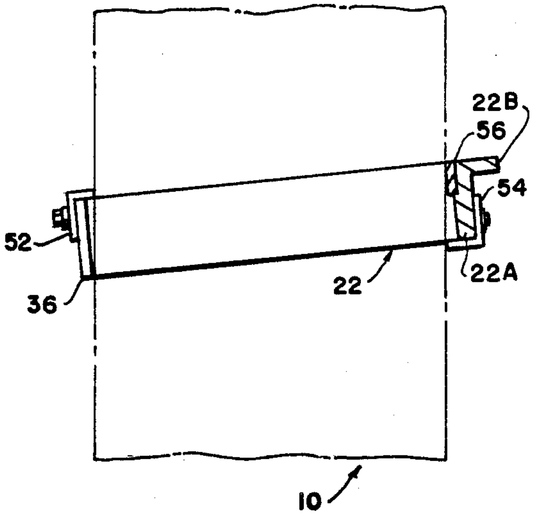
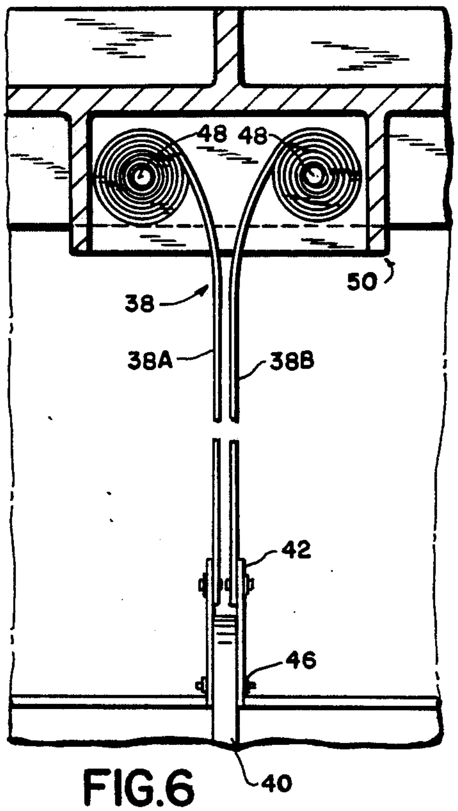
FIG.6

SPRING HANGER SYSTEM FOR RECTANGULAR WAVEGUIDE

FIELD OF THE INVENTION

The present invention relates to devices for suspending or supporting a rectangular waveguide on a transmission tower or other structure and, more specifically, to a hanger device or system interposed between the supporting structure and associated sections of the rectangular waveguide.

BACKGROUND OF THE INVENTION

As rectangular waveguides met with increased usage during the early 1960s, a number of problems developed. Typical towers varied in height from 50 to 2,000 feet, and they were and still are constructed of steel members because of the strength requirements. On the other hand, the typical waveguide was and is made of aluminum which expands and contracts twice as much as steel when the surrounding atmospheric temperature changes. Accordingly, the waveguide will undergo severe stresses, and consequently severe deformations, if constrained in the vertical or axial direction as the seasons run through their normal cycle. The waveguide also undergoes substantial stresses due to wind loads and, consequently, would undergo severe deformation or distortion if not supported judiciously. Such deformations have a tremendously deleterious effect on the waveguide's ability to transmit energy efficiently, that is, without ghosting and other abnormalities in the transmitted signal.

It has been known heretofore to suspend waveguides from transmission towers by means of helically coiled extension springs and a constant force mechanism to compensate for the differential expansion rates between the tower and the waveguide. However, such systems have a number of disadvantages, among which are the large hanger size required, thereby necessitating a substantial distance from the waveguide center line to the hanger mounting surface on the tower, which results in a lack of rigidity. Also, excessive clearance area is required in order to accommodate the spring mechanism. Other disadvantages reside in the criticallity of the initial setting of the springs to conform correctly to the temperature at time of installation, allowing for proper extension and contraction during future temperature changes.

Another waveguide suspension system that has been known makes use of conventional helical springs on the hangers to support the waveguide. This type of suspension also has disadvantages, such as large variations of spring force encountered with large temperature changes. Also, there is a requirement for excessive length in the spring in respect of its working area.

A spring hanger system specifically for a UHF circular waveguide is disclosed in U.S. Pat. No. 3,654,612, and this system overcomes many of the drawbacks already noted. However, the invention described in that patent is directed to the mounting of a large-sized UHF circular waveguide and is not suitable for supporting a rectangular waveguide.

SUMMARY OF THE INVENTION

It is a primary object of the present invention to provide a suspension system for mounting large-sizes of rectangular waveguide to a transmission tower or similar structure in a manner which allows for changes of length of the waveguide run relative to the tower due to the differential expansion occurring between the aluminum and steel, while overcoming the disadvantages of systems known in the past as noted above.

A further object of the invention is to provide a suspension system for large sizes of rectangular waveguide of the above character such that commercially available constant load springs can be used for support at each spring hanger.

Another object of this invention is to provide a suspension system of the foregoing type for supporting a rectangular waveguide on a transmission tower or other structure in such manner as to preclude deleterious deformations of the waveguide when the hanger resists lateral forces due to wind loads on the waveguide.

Still another object is to provide a suspension system for supporting rectangular waveguide such that the entire weight of the vertical run of the waveguide is substantially distributed over the entire height of the tower, thereby placing no undue load on the tower top year round.

Another object is to provide a system of hangers of the foregoing type for supporting a rectangular waveguide on a transmission tower in such a way as to allow vertical movement of the waveguide relative to the tower while substantially restraining all other motion without damaging the waveguide.

Another object of this invention is to provide a non-deforming gripping device for a rectangular waveguide that is not bulky in size and appearance, but instead is simple in construction, having a minimum number of parts; and is therefore easy to install and is relatively inexpensive to manufacture.

The above and other objects are accomplished by providing a plurality of vertically spaced spring hangers attaching a rectangular waveguide to a tower, each of the hangers comprising: (a) a lateral support guide adapted to be rigidly mounted on the tower and surrounding the rectangular waveguide to restrain the waveguide from any appreciable motion in all directions except vertical; (b) a gripping frame spaced vertically downward from the lateral support guide, including means for tightly gripping the outer peripheral surface of the waveguide while precluding deformation of the waveguide when the hanger resists longitudinal or downward forces on the waveguide, said means for tightly gripping including means for causing the gripping frame to tilt automatically with respect to the center line of the waveguide when installed; and (c) constant spring force means connected between the lateral support guide and the gripping frame for transferring a portion of the weight of the waveguide to the supporting structure or tower.

Other and further objects, advantages and features of the present invention will be understood by reference to the following specification in conjunction with the annexed drawing, wherein like parts have been given like numbers.

BRIEF DESCRIPTION OF THE DRAWING

FIG. 2 is an isometric view of a waveguide hanger embodying this invention.

FIG. 3 is an enlarged combination fragmented cross section view taken on line 3—3 of FIG. 4A, including the side elevation behind line 3—3, of the hanger embodied in this invention, shown in phantom attached to a tower member, with a section of waveguide in its proper location; further illustrating the location of the axis of support for the constant load spiral springs.

FIG. 4 is a plan view illustrating in FIG. 4A the lateral support guide and in FIG. 4B the non-deforming gripping frame.

FIG. 5 is a combination cross sectional view taken on the line 5—5, in FIG. 4B, illustrating the gripping and essential details of the spring loading clamp and the engaging steel inserts.

FIG. 6 is an enlarged fragmented sectional view taken on the line 6—6 in FIG. 4A, and illustrating the related positions of the spiral spring means.

FIG. 7 is a sectional view of a preferred form for the bearing means in conjunction with the lateral support guide.

DESCRIPTION OF PREFERRED EMBODIMENT OF THE INVENTION

Figure 1:
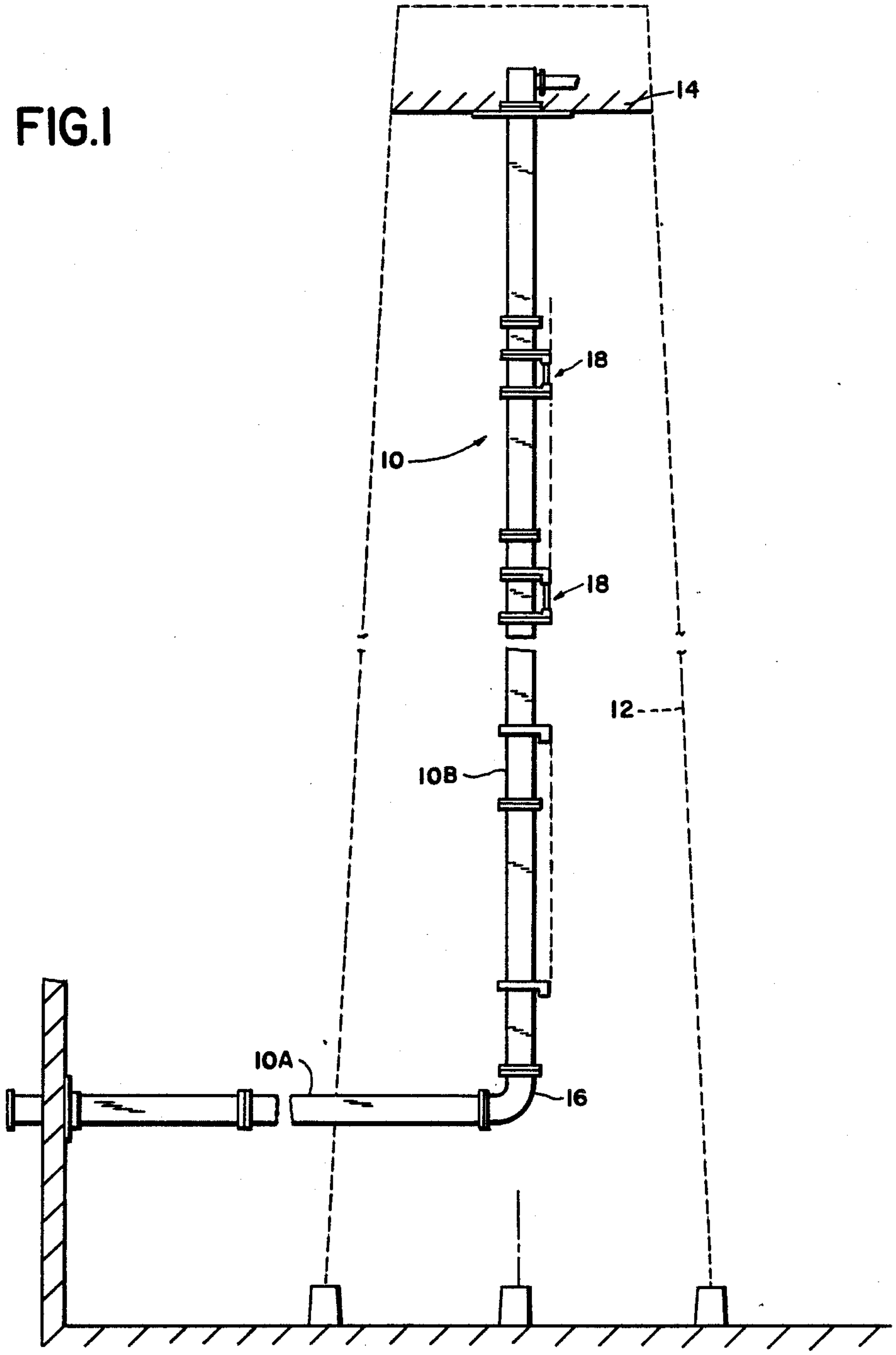
FIG. 1 is an elevation view of a large rectangular waveguide installed in a transmission tower, the tower being outlined only in segments corresponding to the broken segment of the waveguide.

Referring to the figures of the drawing, and particularly to FIG. 1, the invention is there illustrated supporting a typical run of large rectangular waveguide 10, including the horizontal portion 10A as well as the vertical portion 10B of the waveguide run, on a television transmission tower 12. Both the waveguide run and the tower are shown in corresponding broken sections to conserve space on the drawing and to facilitate the illustration. As will be seen, the tower is merely outlined or shown in phantom schematic.

The overall height of the steel tower may be anywhere from 50 to 2,000 feet and, in this instance, it is of the order of 2,000 feet. The sections of waveguide are 12 feet long. Accordingly, 160 lengths are needed to connect the top anchor plate 14 to the horizontal flange of the waveguide elbow 16, which is 1,920 feet below, thus requiring 160 vertical spring hangers.

Referring now to FIGS. 2–7, each of the spring hangers 18 is adapted to support one 12-foot section of waveguide. A hanger comprises a lateral support guide 20 (see FIGS. 2 and 3) surrounding the wave guide 10. It further comprises a gripping frame 22 vertically spaced from the lateral waveguide support 20 and interposed between the two elements is a spring means 24.

The lateral support guide 20 is preferably made in three parts, namely, a major part which is a generally U-shaped frame 26, and two minor parts, that is, extensions or plates 28 which extend transversely in opposite directions so that the waveguide can be substantially surrounded. The plates are connected to the frame 26 by suitable attaching means, such as bolts or the like, which are extended through outwardly directed portions 30 of the frame 26, which is also provided with flange portion 26A and upstanding portion 26B.

It will be appreciated that the lateral support guide 20 is firmly fixed by means of suitable bolts which are run through upstanding mounting flange 31 of the frame 26.

It will be understood that the function of this lateral support guide is to restrain motion in any lateral direction while allowing for free motion of the waveguide up and down vertically.

Plastic strips 32, eight in number, at the inner peripheral surface of the frame 26 accommodate the vertical motion with very little frictional resistance. The judicious location of these plastic strips, namely two at each corner of the frame 26, enables accommodation of anticipated wind loads without distortion or deformation to the waveguide. These strips of heat and sun resistant plastic provide a satisfactory bearing surface for the waveguide over an extremely broad range of temperature.

The spring hanger 18 (FIG. 1) further comprises the non-distorting or non-deforming gripping frame 22 (FIG. 3), as already noted. This component is constructed similarly to the lateral support guide, that is, it comprises a generally U-shaped major part 34 (FIG. 2) and minor pieces or extensions in the form of plates 36 which are directed transversely inwardly for purposes that will be apparent. The gripping frame 22 (FIG. 3) is not affixed to the tower 12 (FIG. 1), but instead is connected to the lateral support guide 20 (FIG. 3) by means of a constant force spiral spring means 38 (FIG. 6).

It will thus be understood that the weight of a section of waveguide is transmitted from the gripping frame 22 (FIG. 3) through the lateral support guide 20 to the tower member. The constant force spiral spring means 38 (FIG. 6) is attached to the gripping frame 22 (FIG. 2) by means of the lifting tab 40 (FIG. 2) provided thereon. It will be seen in the figures (particularly in FIG. 2 and FIG. 3) that a securing member 42 is provided at the lower end of spring means 38. A slot 44 (FIG. 2) is formed in member 42 to receive pivot pin 46 (FIG. 2) which is secured in the tab 40.

It will be noted that the spring means 38 (FIG. 6) comprises two spiral springs 38A and 38B which are mounted oppositely on axles 48 (FIG. 6). The springs are free to rotate on the axles, and both are protected from weather, being enclosed in housing 50 (FIG. 6), which forms part of the lateral support guide 20 and has an open bottom.

Associated with the gripping frame 22 (FIG. 2) are four spring loaded clamps. A pair 52 of these may be especially seen in the perspective view of FIG. 2 as well as in FIG. 5; whereas the other two are best appreciated by reference to 54 (FIG. 5). The two outboard clamps, that is, the clamps 52 readily seen in FIG. 2, are affixed by means of a bolt or the like to the top corners of respective plates 36, which are secured at the ends of the U-shaped frame. The inboard clamps 54, i.e., the clamps adjacent the tower 12, are fixed to the bottom of skirt portion 22A, below flange 22B, at spaced locations aligned with the respective outboard clamps. The clamps 52 and 54 are designed to cause tilting of the gripping frame in the proper direction (FIG. 5) when the plates 36 are bolted at the ends of the U-shaped member, thereby to prevent vertical movement of said frame when a vertical lifting force is applied to the lifting tab 40. Steel inserts 56 (FIG. 5) are provided at the upper ends of the inboard clamps 54 to bear against the waveguide 10.

Referring now to FIG. 7, there is depicted a sectional view of the preferred configuration for the lateral support guide 20 and its associated plastic strip 32. This arrangement, because of the tapering of the skirt 26B above and below the flange 26A of the guide 20 and of the corresponding tapering of the associated strip, allows a bearing surface to exit at all times. This will be appreciated from the fact that a broad wall of waveguide 10, when seen in its normal position depicted by line 60, will bear against the midpoint of strip 32. However, if there is angular misalignment of the waveguide in either direction as shown by the phantom line 62, there will still be a bearing surface provided. Otherwise, that is, if there were no tapered arrangement as seen, there would only be a bearing surface provided when the guide is at an angular misalignment.

From the present disclosure it should be apparent that the spring hanger system described offers a near perfect solution to the many problems that have faced both the manufacturer and user of large sizes of rectangular waveguide over the past several years. The components are easily manufactured, commercially available, easy to assemble and install and they are perfectly capable of operating satisfactorily in the various weather conditions that such waveguide installations are certain to encounter.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

I claim:

1. A spring hanger system for supporting on a transmission tower a hollow rectangular waveguide defined by a plurality of walls and having a vertical center line, the system including a plurality of vertically spaced spring hangers attaching said waveguide to said tower, each said hanger comprising:

(a) a lateral support guide adapted to be rigidly mounted on said tower and substantially surrounding the rectangular waveguide to restrain the waveguide from any appreciable motion in all directions except vertical;

(b) a gripping frame spaced vertically downward from said lateral support guide, including means for tightly gripping the outer peripheral surface of the waveguide while precluding deformation of the waveguide when the hanger resists vertical movement of the waveguide relative to the tower, said means for tightly gripping including clamp means for causing said gripping frame to tilt with respect to said vertical center line of the waveguide; and (c) constant force spring means connected between said lateral support guide and said gripping frame for transferring a portion of the weight of the waveguide to the structure of said transmission tower.

2. A system as defined in claim 1, in which said lateral support guide is rigidly mounted on said tower by means of a mounting flange on said lateral support guide.

3. A system as defined in claim 1, in which said waveguide comprises two broad walls and two narrow walls; and said lateral support guide has a major portion which is substantially U-shaped so as to enclose one of said broad walls and both of said narrow walls.

4. A system as defined in claim 3, in which a minor portion of said lateral support guide includes an extension plate at respective ends of the U-shaped portion, said extension plates being oppositely directed so as partly to enclose the other broad wall.

5. A system as defined in claim 1, in which said waveguide comprises two broad walls and two narrow walls; and said gripping frame has a major portion which is substantially U-shaped so as to enclose one of said broad walls and both of said narrow walls.

6. A system as defined in claim 5, in which a minor portion of such gripping frame includes an extension plate at respective ends of the U-shaped portion, said extension plates being oppositely directed so as partly to enclose the other broad wall.

7. A system as defined in claim 6, further including a lifting tab on said gripping frame to which said spring means is attached; said means for enabling said gripping frame to tilt including four spring loaded clamps, two of which are secured outboard to the respective extension plates, and two of which are secured inboard to a skirt portion of said gripping frame, thereby causing the gripping frame to assume an acute angular position with respect to said vertical center line of the guide, thereby preventing vertical movement of the gripping frame relative to the guide when a vertical force is applied to the lifting tab.

8. A system as defined in claim 7, in which said constant force spring means includes at least one spiral spring, and further including a securing member, connected to said lifting tab, to which the lower end of said spring is secured.

9. A system as defined in claim 8, in which said constant force spring means includes a pair of spiral springs.

10. A system as defined in claim 1, further including bearing means at spaced locations on said lateral support guide for furnishing bearing surfaces for the waveguide.

11. A system as defined in claim 10, in which said bearing means comprises a plurality of plastic elements, two of said elements being provided at each of the four inner corners of said lateral support guide.

12. A system as defined in claim 11, further including a housing formed in said lateral support guide, said housing containing a pair of axles on which the upper ends of said pair of spiral springs are respectively mounted for rotation.

13. A system as defined in claim 1, in which said lateral support guide is formed to include a horizontal flange, having a rectangular inner and outer edge, and a rectangular skirt extending equally upwardly and downwardly from the inner edge of said flange; said support guide having inner dimensions substantially greater than the outside dimensions of the waveguide; and non-metallic bearing means disposed in diagonally opposed corner relationship between said skirt and the waveguide, the inner surfaces of said bearing means tapering outwardly from said vertical center line as the skirt extends upwardly and downwardly from the horizontal flange, thereby allowing for minor angular misalignments of the support guide with respect to the vertical center line of the waveguide.

* * * * *